(12) United States Patent
Huang et al.

(10) Patent No.: US 10,237,545 B1
(45) Date of Patent: Mar. 19, 2019

(54) IMAGE PICKUP MODULE TEST SYSTEM AND METHOD

(71) Applicant: Primax Electronics Ltd., Taipei (TW)

(72) Inventors: Shih-Jung Huang, Taipei (TW); Sheng-Chi Chan, Taipei (TW)

(73) Assignee: PRIMAX ELECTRONICS LTD, Taipei (TW)

( * ) Notice: Subject to any disclaimer, the term of this patent is extended or adjusted under 35 U.S.C. 154(b) by 0 days.

(21) Appl. No.: 15/993,390

(22) Filed: May 30, 2018

(30) Foreign Application Priority Data

Mar. 23, 2018 (TW) .............................. 107110095 A

(51) Int. Cl.
*H04N 17/00* (2006.01)
*H04N 5/225* (2006.01)

(52) U.S. Cl.
CPC ......... *H04N 17/002* (2013.01); *H04N 5/2254* (2013.01); *H04N 5/2257* (2013.01)

(58) Field of Classification Search
CPC ...... H04N 17/002; H04N 17/00; H04N 17/02; H04N 5/2254; H04N 5/2257; G06T 7/0018

USPC .................. 348/187, 188, 180; 702/108, 116
See application file for complete search history.

(56) References Cited

U.S. PATENT DOCUMENTS

2014/0152845 A1* 6/2014 Seger ................... H04N 17/002
348/188
2016/0252424 A1* 9/2016 Mateti .................. H04N 17/002
348/187

* cited by examiner

*Primary Examiner* — Sherrie Hsia
(74) *Attorney, Agent, or Firm* — Kirton McConkie; Evan R. Witt

(57) ABSTRACT

An image pickup module test system includes a computing device, an optical reflector, a block gauge and a fixing device. A test program is executed in the computing device. The image pickup module is fixed at a position in front of the optical reflector by the fixing device. The image pickup device acquires an image of the image pickup module and the block gauge that is reflected from the optical reflector. The test program analyzes the image to obtain a feature point of the image pickup module and a feature point of the block gauge. Moreover, the test program judges whether an installation location of at least one lens unit of the image pickup module complies with a production specification according to the standard length value corresponding to the single pixel of the image and the feature point of the image pickup module.

13 Claims, 4 Drawing Sheets

1

IMAGE PICKUP MODULE TEST SYSTEM AND METHOD

FIELD OF THE INVENTION

The present invention relates to a field of testing an image pickup module, and more particularly to a system and a method for testing an installation location of a lens unit of an image pickup module.

BACKGROUND OF THE INVENTION

With the advent of the Internet age, people can use electronic devices to communicate and interact with each other at any time and in any place. In addition, an image pickup device has gradually become one of the essential components of the electronic device. The electronic devices with the image pickup devices can be used to make video calls to have the face-to-face talk. Moreover, the electronic devices with the image pickup devices can be used to photograph the surrounding scenery or objects at any time and in any place and share photos with family members or friends.

Generally, the image pickup module of the electronic device has a dual-lens design. The two lenses of the dual-lens design can be used to capture ultra-wide-angle images or 3D images and also be used to create the depth-of-field effect. However, if the errors associated with the installation locations of the lens units are very large during the process of fabricating the dual-lens image pickup module, the image pickup module is possibly unable to capture the ultra-wide-angle images or the 3D images or unable to create the accurate depth-of-field effect of the images. Consequently, it is important to test whether the installation locations of the lens units of the image pickup module comply with the production specifications.

Conventionally, a 2.5D image measuring instrument is used to test the installation locations of the lens units of the image pickup module. However, the process of operating the 2.5D image measuring instrument is very complicated. That is, it takes a long time for the test worker to test the installation locations of the lens units of one image pickup module, or it is only possible to sample some image pickup modules in the same batches and test the installation locations of the lens units of the sampled image pickup modules. In such way, the efficiency of detecting the image pickup module is impaired, or the production yield of the image pickup module is reduced.

Therefore, there is a need of providing a system and a method for quickly testing an installation location of a lens unit of an image pickup module.

SUMMARY OF THE INVENTION

The present invention provides a system and a method for quickly testing an installation location of a lens unit of an image pickup module.

In accordance with an aspect of the present invention, there is provided an image pickup module test system for testing an installation location of at least one lens unit of an image pickup module. The image pickup module test system includes a computing device, an optical reflector, a block gauge and a fixing device. The computing device is electrically connected with the image pickup module. A test program is executed in the computing device. The block gauge is arranged in front of the optical reflector. The block gauge has a standard length. The image pickup module is fixed at a position in front of the optical reflector by the fixing device. When the test program is executed, the image pickup device is enabled to acquire an image of the image pickup module and the block gauge that is reflected from the optical reflector. The test program analyzes the image to obtain a feature point of the image pickup module and a feature point of the block gauge, calculates a standard length value corresponding to a single pixel of the image according to the feature point of the block gauge, and judges whether the installation location of the at least one lens unit complies with a production specification according to the standard length value corresponding to the single pixel of the image and the feature point of the image pickup module.

In an embodiment, the feature point of the image pickup module contains an edge feature of a lens module of the lens unit or an edge feature of a fastening hole of at least one fastening part.

In an embodiment, the production specification contains a linear distance between a center of the lens module and a top edge of a casing of the image pickup module or a linear distance between the center of the lens module and a lateral edge of the casing.

In an embodiment, the at least one lens unit includes a first lens unit and a second lens unit, the first lens unit includes a first lens module, the second lens unit includes a second lens module, and the production specification contains a linear distance between the a center of the first lens module and a center of the second lens module.

In an embodiment, the image pickup module test system further includes a display module. The display module includes a display interface, and the image is shown on the display interface.

In an embodiment, the image pickup module test system further includes a light source. The light source provides light beams that allow the image pickup module to acquire the image.

In an embodiment, the optical reflector is a plane mirror.

In an embodiment, the at least one lens unit and the block gauge are coplanar with each other, and a focusing distance between the at least one lens unit and the optical reflector is in a range between 3 cm and 6 cm.

In an embodiment, the standard length of the block gauge is 2 cm.

In accordance with another aspect of the present invention, there is provided an image pickup module test method for testing an installation location of at least one lens unit of an image pickup module. The image pickup module test method includes the following steps. In a step (a), an image pickup module and a block gauge are placed in front of an optical reflector, wherein the block gauge has a standard length. In a step (b), the image pickup module is enabled to acquire an image of the image pickup module and the block gauge reflected from the optical reflector. In a step (c), the image is analyzed to obtain a feature point of the image pickup module and a feature point of the block gauge in the image. In a step (d), a standard length value corresponding to a single pixel of the image is calculated according to the feature point of the block gauge. Then, a step (e) is performed to judges whether the installation location of the at least one lens unit complies with a production specification according to the standard length value corresponding to the single pixel of the image and the feature point of the image pickup module. If the installation location of the at least one lens unit does not comply with the production specification, a warning signal is generated. If the installation location of the at least one lens unit complies with the production specification, a next step is performed. In a step (f), a test pass signal is generated.

Preferably, in the step (c), the feature point of the image pickup module in the image contains an edge feature of a lens module of the lens unit or an edge feature of a fastening hole of at least one fastening part.

Preferably, in the step (d), the production specification contains a linear distance between a center of the lens module and a top edge of a casing of the image pickup module or a linear distance between the center of the lens module and a lateral edge of the casing.

Preferably, in the step (d), the at least one lens unit includes a first lens unit and a second lens unit, the first lens unit includes a first lens module, the second lens unit includes a second lens module, and the production specification contains a linear distance between the a center of the first lens module and a center of the second lens module.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
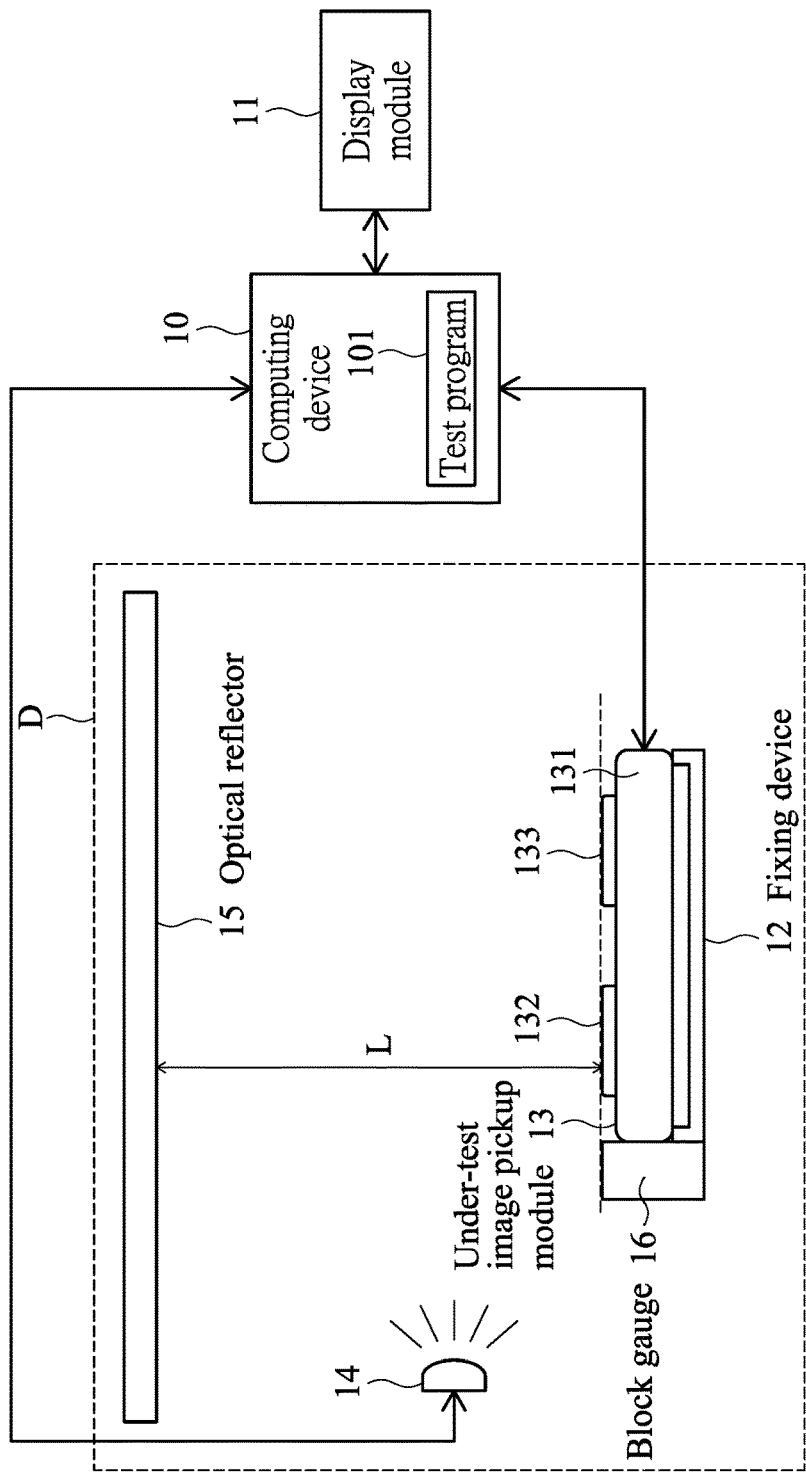
FIG. 1 schematically illustrates the architecture of an image pickup module test system according to an embodiment of the present invention.

Please refer to FIG. 1. FIG. 1 schematically illustrates the architecture of an image pickup module test system according to an embodiment of the present invention. As shown in FIG. 1, the image pickup module test system 1 comprises a computing device 10, a display module 11, a fixing device 12, an under-test image pickup module 13, a light source 14, an optical reflector 15 and a block gauge 16. The fixing device 12, the under-test image pickup module 13, the light source 14, the optical reflector 15 and the block gauge 16 are disposed within a detection box D. Consequently, while the image pickup module 13 acquires an image, the test result is not interfered by the ambient light beams.

Please refer to FIG. 1 again. The computing device 10 is electrically connected with the display module 11, the image pickup module 13 and the light source 14. A test program 101 is installed and executed in the computing device 10. An example of the test program 101 is an image edge test program, which is written in a common C++ program language. When the test program 101 is executed, the computing device 10 enables the image pickup module 13 and controls the light source 14 to emit light beams. In an embodiment, the image pickup module 13 comprises a casing 131, a first lens unit 132 and a second lens unit 133.

The image pickup module 13 is fixed on the fixing device 12 by an adhering means, a clamping means, a screwing means or another appropriate fixing means. The image pickup module 13 is arranged in front of the optical reflector 15. The block gauge 16 is also arranged in front of the optical reflector 15 and located beside a side of the image pickup module 13. Consequently, the mirror image of the image pickup module 13 and the block gauge 16 is reflected from the optical reflector 15. In this embodiment, the block gauge 16, the first lens unit 132 and the second lens unit 133 of the image pickup module 13 are coplanar with each other. Moreover, a focusing distance L between the first lens unit 132 (or the second lens unit 133) and the optical reflector 15 is in the range between 3 cm and 6 cm. An example of the optical reflector 15 is a plane mirror.

After the test program 101 is executed to control the light source 14 to emit the light beams, the image pickup module 13 is enabled. Consequently, the image pickup module 13 acquires an image of the image pickup module 13 and the block gauge 16 that is reflected from the optical reflector 15. Moreover, the test program 101 calculates a standard length value corresponding to a single pixel of the image according to the feature points of the block gauge 16 in the image. Then, according to the standard length value corresponding to the single pixel of the image, the test program 101 analyzes whether the installation locations of the first lens unit 132 and the second lens unit 133 of the image pickup module 13 comply with the production specifications. In this embodiment, the image pickup module 13 comprises two lens units. It is noted that the applications of the image pickup module test system of the present invention are not restricted. For example, in some embodiments, the image pickup module test system can be used to test the installation location of a single lens unit of the image pickup module or the installation locations of plural lens units of the image pickup module.

Figure 2:
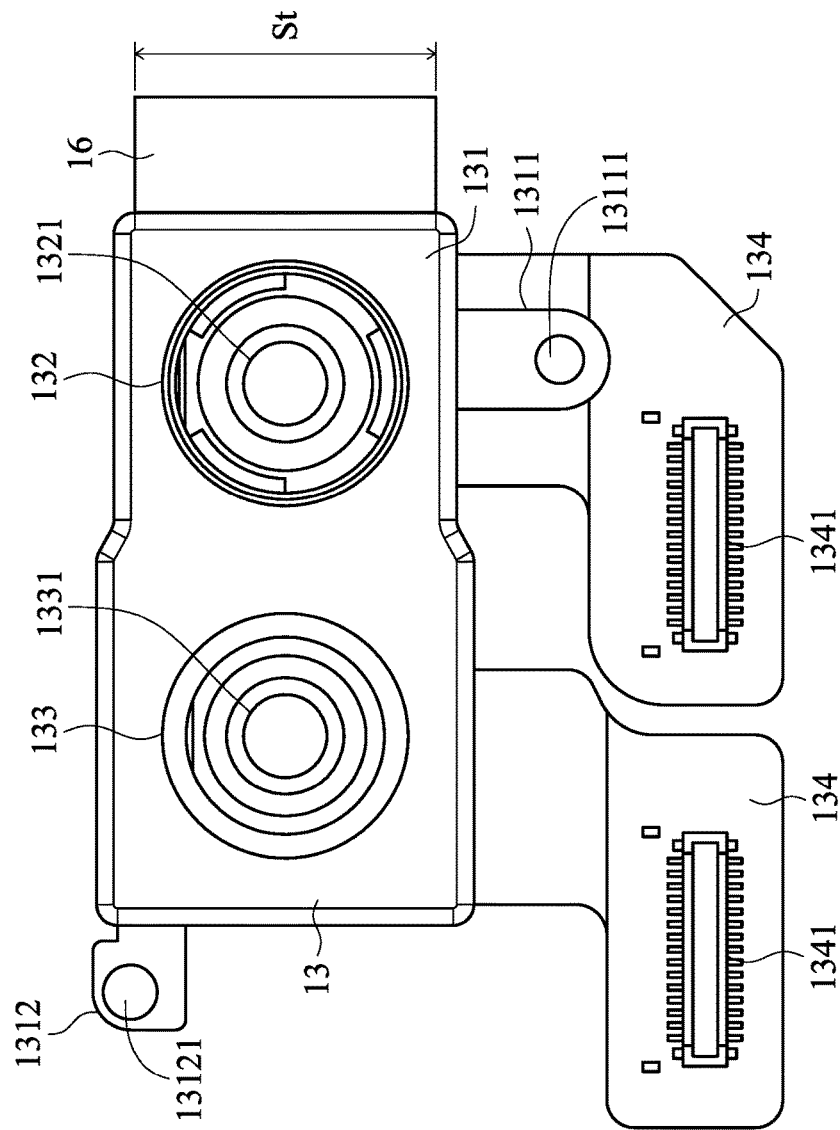
FIG. 2 is a front view illustrating the image pickup module and the block gauge of the image pickup module test system according to the embodiment of the present invention.

FIG. 2 is a front view illustrating the image pickup module and the block gauge of the image pickup module test system according to the embodiment of the present invention. As shown in FIG. 2, the block gauge 16 is located beside the image pickup module 13. The block gauge 16 has a standard length St. For example, the standard length St is 2 cm. In an embodiment, the image pickup module 13 comprises the casing 131, the first lens unit 132, the second lens unit 133 and a circuit board 134. Moreover, a first fastening part 1311 and a second fastening part 1312 are protruded from a periphery of the casing 131. The first fastening part 1311 has a first fastening hole 13111. The second fastening part 1312 has a second fastening hole 13121.

The image pickup module 13 is fixed on a casing or a main board of an electronic device (not shown) through the first fastening part 1311 and the second fastening part 1312. An example of the electronic device includes but is not limited to a notebook computer, a tablet computer, a personal digital assistant, a smart phone or a game console. The first lens unit 132 and the second lens unit 133 are disposed on the casing 131. The first lens unit 132 comprises a first lens module 1321. The second lens unit 133 comprises a second lens module 1331. The circuit board 134 is connected with the casing 131. A connector 1341 is disposed on a surface of the circuit board 134. The connector 1341 is electrically connected with the main board of the electronic device. After the optical image is acquired by the image pickup module 13, the optical image is converted into an electronic signal. Then, the electronic signal is transmitted from the image pickup module 13 to the main board of the electronic device through the connector 1341. Moreover, the connector 1341 of the image pickup module 13 is electrically connected with the computing device 10. After the acquired optical image is converted into the electronic signal, the electronic signal is transmitted to the computing device 10. Then, the test program analyzes the image edge features according to the electronic signal.

Figure 3:
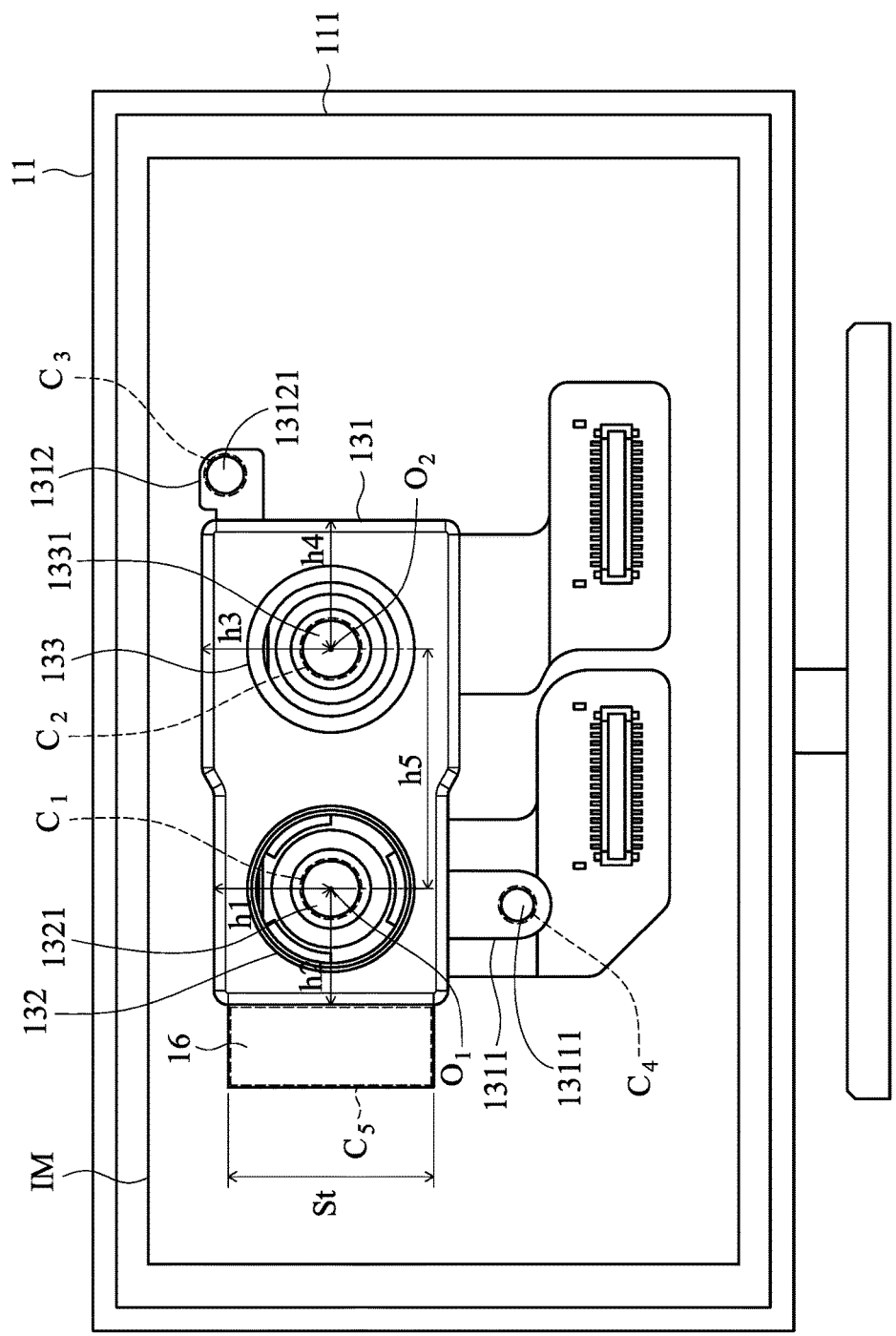
FIG. 3 schematically illustrates a scenario of operating the image pickup module test system of the present invention to perform the image analysis.

FIG. 3 schematically illustrates a scenario of operating the image pickup module test system of the present invention to perform the image analysis. As shown in FIG. 3, the display module 11 comprises a display interface 111. An image IM reflected from the optical reflector 15 (see FIG. 1) and captured by the image pickup module 13 is shown on the display interface 111. The image IM contains the image of the image pickup module 13 and the image of the block gauge 16. Moreover, the image of the image pickup module 13 and the image of the block gauge 16 are expressed with mirror images.

A process of performing the image analysis will be described as follows. Firstly, the test program 101 analyzes the image IM by using an image edge detection technology. For example, the image edge detection technology includes a smooth filtering process, a sharp filtering process, an edge determination process and an edge connection process. According to the analyzing result, the feature points of the image IM are acquired. After the edge features of the first lens module 1321 of the first lens unit 132 in the image IM are analyzed, a feature point C1 corresponding to the first lens module 1321 is obtained. Moreover, a center O1 of the first lens module 1321 is defined according to the feature point C1. Similarly, after the edge features of the second lens module 1331 of the second lens unit 133 are analyzed, a feature point C2 corresponding to the second lens module 1331 is obtained. Moreover, a center O2 of the second lens module 1331 is defined according to the feature point C2. Similarly, after the edge features of the second fastening hole 13121 of the second fastening part 1312 are analyzed, a feature point C3 corresponding to the second fastening hole 13121 is obtained. Similarly, after the edge features of the first fastening hole 13111 of the first fastening part 1311 are analyzed, a feature point C4 corresponding to the first fastening hole 13111 is obtained. Similarly, after the edge features of the block gauge 16 are analyzed, a feature points C5 corresponding to the block gauge 16 is obtained. Then, the test program 101 recognizes the orientation of the image pickup module 13 in the image IM according to the relative positions of the feature points C1, C2, C3, C4 and C5. Moreover, the test program 101 calibrates the orientation of the image pickup module 13 in the image IM according to the feature points C1, C2, C3, C4 and C5. After calibration, the two lateral edges of the casing 131 are perpendicular to the horizontal direction, or the top edge or the bottom edge of the casing 131 is in parallel with the horizontal direction.

Please refer to FIG. 3 again. Then, the test program 101 calculates the standard length value corresponding to the single pixel of the image IM according to the feature point C5 of the block gauge 16. Moreover, when the test process is started, the standard length St of the block gauge 16 (e.g., St=2 cm) is inputted into the test program 101 through an input device (not shown) of the computing device 10. Consequently, the test program 101 can calculate the standard length value corresponding to the single pixel of the image IM according to the feature point C5 of the block gauge 16. For example, in case that the feature point C5 has 250 in the vertical direction and the standard length St of the block gauge 16 is 2 cm, the standard length value corresponding to the single pixel of the image IM is 0.008 cm (i.e., 2 cm/250=0.008 cm). In the above embodiment, the standard length St of the block gauge 16 is 2 cm. It is noted that the block gauge with a different standard length is feasible.

Then, the test program 101 judges whether the installation locations of the first lens unit 132 and the second lens unit 133 comply with the production specifications according to the standard length value corresponding to the single pixel of the image IM and the feature points C1, C2, C3 and C4 of the image pickup module 13. For example, the contents of the production specifications contain the linear distance h1 between the center O1 of the first lens unit 132 and the top edge of the casing 131, the linear distance h2 between the center O1 of the first lens unit 132 and the first lateral edge of the casing 131, the linear distance h3 between the center O2 of the second lens unit 133 and the top edge of the casing 131, the linear distance h4 between the center O2 of the second lens unit 133 and the second lateral edge of the casing 131 and the linear distance h5 between the center O1 of the first lens unit 132 and the center O2 of the second lens unit 133. The test program 101 analyzes the image IM to calculate the pixel number of the linear distance h1, the pixel number of the linear distance h2, the pixel number of the linear distance h3, the pixel number of the linear distance h4 and the pixel number of the linear distance h5. Consequently, the actual lengths corresponding to the linear distances h1, h2, h3 and h4 are estimated. For example, in case that the pixel number of the linear distance h1 is 125, it is estimated that the actual distance corresponding to the linear distance h1 is 1 cm (i.e., 0.008 cm×125=1 cm). That is, the actual lengths corresponding to the linear distances h1, h2, h3 and h4 are estimated according to the result of analyzing the pixel numbers of the linear distances h1, h2, h3 and h4. After the actual lengths corresponding to the linear distances h1, h2, h3 and h4 are estimated, the test program 101 judges whether the installation locations of the first lens unit 132 and the second lens unit 133 of the image pickup module 13 comply with the production specifications. In the above embodiment, the contents of the production specifications contain the linear distances h1, h2, h3 and h4. It is noted that the contents of the production specifications are not restricted. In case that the type of the image pickup module is varied, the contents of the production specifications are correspondingly changed.

Figure 4:
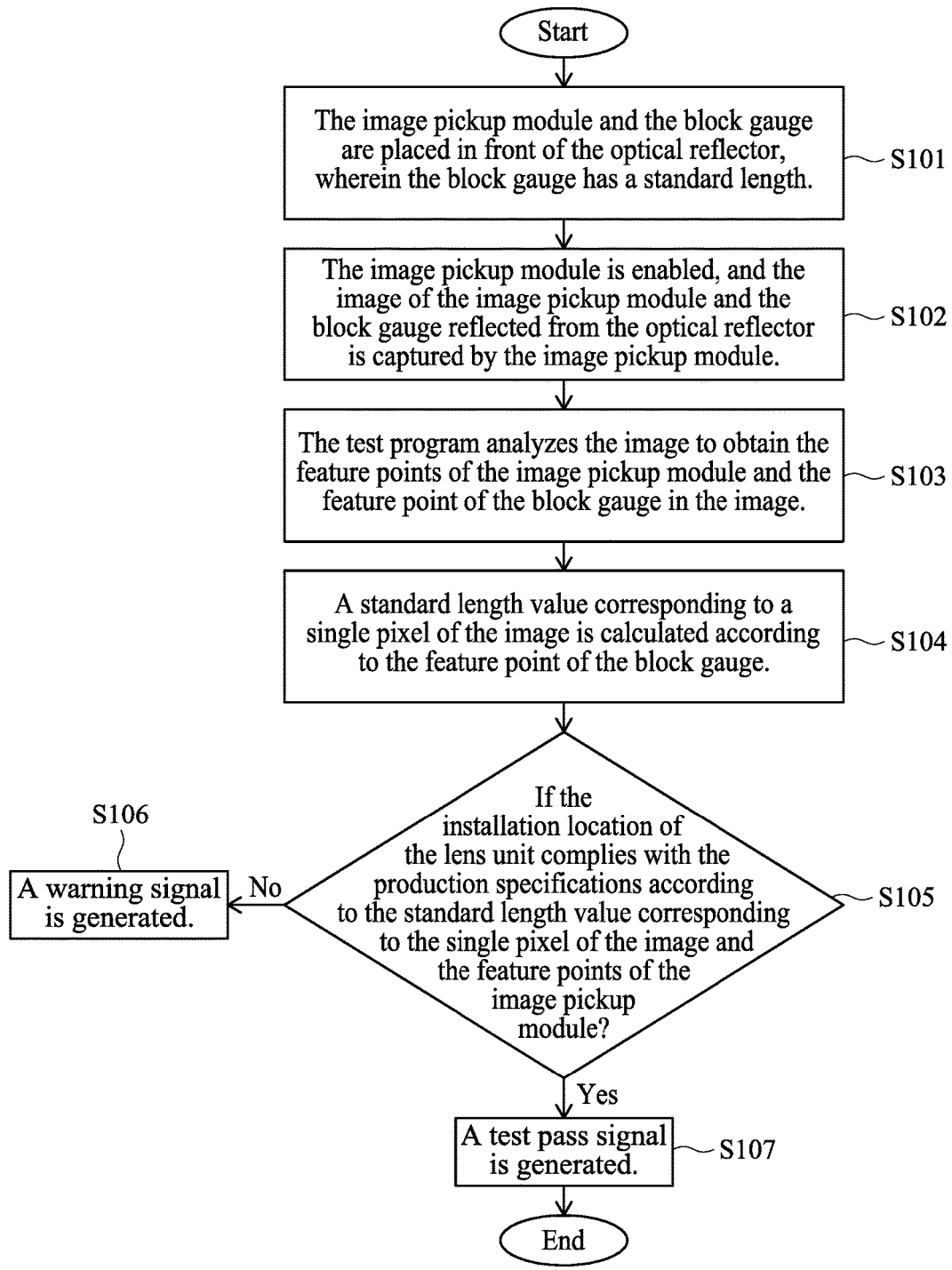
FIG. 4 is flowchart illustrating an image pickup module test method according to an embodiment of the present invention.

Please refer to FIGS. 1, 2, 3 and 4. FIG. 4 is flowchart illustrating an image pickup module test method according to an embodiment of the present invention. Firstly, the image pickup module 13 and the block gauge 16 are placed in front of the optical reflector 15, wherein the block gauge 16 has a standard length St (Step S101). In the step S101, the image pickup module 13 is electrically connected with a computing device 10, and the image pickup module 13 is fixed on a fixing device 12. The image pickup module 13 is arranged in front of the optical reflector 15. The block gauge 16 is also arranged in front of the optical reflector 15 and located beside a side of the image pickup module 13. Consequently, the mirror image of the image pickup module 13 and the block gauge 16 is reflected from the optical reflector 15. In this embodiment, the block gauge 16, the first lens unit 132 and the second lens unit 133 of the image pickup module 13 are coplanar with each other. Moreover, the focusing distance L between the first lens unit 132 (or the second lens unit 133) and the optical reflector 15 is in the range between 3 cm and 6 cm.

Then, the image pickup module 13 is enabled, and the image IM of the image pickup module 13 and the block gauge 16 reflected from the optical reflector 15 is captured by the image pickup module 13 (Step S102). In the step S102, the image pickup module 13 is enabled after the test program 101 of the computing device 10 is executed to control the light source 14 to emit the light beams. Consequently, the image pickup module 13 acquires the image IM of the image pickup module 13 and the block gauge 16 that is reflected from the optical reflector 15.

Then, the test program analyzes the image IM to acquire the feature points of the image pickup module 13 and the feature point of the block gauge 16 in the image IM (Step S103). In the step S103, the test program 101 analyzes the image IM by using an image edge detection technology. For example, the image edge detection technology includes a smooth filtering process, a sharp filtering process, an edge determination process and an edge connection process. For example, after the edge features of the first lens module 1321 of the first lens unit 132 in the image IM are analyzed, a feature point C1 corresponding to the first lens module 1321 is obtained and a center O1 of the first lens module 1321 is defined according to the feature point C1. Similarly, after the edge features of the second lens module 1331 of the second lens unit 133 are analyzed, a feature point C2 corresponding to the second lens module 1331 is obtained and a center O2 of the second lens module 1331 is defined according to the feature point C2. Similarly, after the edge features of the second fastening hole 13121 of the second fastening part 1312 are analyzed, a feature point C3 corresponding to the second fastening hole 13121 is obtained. Similarly, after the edge features of the first fastening hole 13111 of the first fastening part 1311 are analyzed, a feature point C4 corresponding to the first fastening hole 13111 is obtained. Similarly, after the edge features of the block gauge 16 are analyzed, a feature points C5 corresponding to the block gauge 16 is obtained. In an embodiment, the test program 101 recognizes the orientation of the image pickup module 13 in the image IM according to the relative positions of the feature points C1, C2, C3, C4 and C5. Moreover, the test program 101 calibrates the orientation of the image pickup module 13 in the image IM according to the feature points C1, C2, C3, C4 and C5. After calibration, the two lateral edges of the casing 131 are perpendicular to the horizontal direction, or the top edge or the bottom edge of the casing 131 is in parallel with the horizontal direction. In the above embodiment, the feature points of the image pickup module 13 are determined according to the edge features of the first lens module 1321, the second lens module 1331, the first fastening hole 13111 and the second fastening hole 13121. It is noted that the feature points of the image pickup module are not restricted. In case that the appearance of the image pickup module is varied, the feature points of the image pickup module are correspondingly changed.

Then, a standard length value corresponding to a single pixel of the image IM is calculated according to the feature point of the block gauge (Step S104). In the step S104, the standard length St of the block gauge 16 (e.g., St=2 cm) is previously inputted into the test program 101 through an input device (not shown) of the computing device 10. Consequently, the test program 101 can calculate the standard length value corresponding to the single pixel of the image IM according to the feature point C5 of the block gauge 16. For example, in case that the feature point C5 has 250 in the vertical direction and the standard length St of the block gauge 16 is 2 cm, the standard length value corresponding to the single pixel of the image IM is 0.008 cm (i.e., 2 cm/250=0.008 cm).

Then, the test program 101 judges whether the installation location of the lens unit complies with the production specifications according to the standard length value corresponding to the single pixel of the image IM and the feature points of the image pickup module 13 (Step S105). In the step S105, the test program 101 judges whether the installation locations of the first lens unit 132 and the second lens unit 133 comply with the production specifications according to the standard length value corresponding to the single pixel of the image IM and the feature points C1, C2, C3 and C4 of the image pickup module 13. For example, the contents of the production specifications contain the linear distance h1 between the center O1 of the first lens unit 132 and the top edge of the casing 131, the linear distance h2 between the center O1 of the first lens unit 132 and the first lateral edge of the casing 131, the linear distance h3 between the center O2 of the second lens unit 133 and the top edge of the casing 131, the linear distance h4 between the center O2 of the second lens unit 133 and the second lateral edge of the casing 131 and the linear distance h5 between the center O1 of the first lens unit 132 and the center O2 of the second lens unit 133. The test program 101 analyzes the image IM to calculate the pixel number of the linear distance h1, the pixel number of the linear distance h2, the pixel number of the linear distance h3, the pixel number of the linear distance h4 and the pixel number of the linear distance h5. Consequently, the actual lengths corresponding to the linear distances h1, h2, h3 and h4 are estimated. For example, in case that the pixel number of the linear distance h1 is 125, it is estimated that the actual distance corresponding to the linear distance h1 is 1 cm (i.e., 0.008 cm×125=1 cm). That is, the actual lengths corresponding to the linear distances h1, h2, h3 and h4 are estimated according to the result of analyzing the pixel numbers of the linear distances h1, h2, h3 and h4. After the actual lengths corresponding to the linear distances h1, h2, h3 and h4 are estimated, the test program 101 judges whether the installation locations of the first lens unit 132 and the second lens unit 133 of the image pickup module 13 comply with the production specifications.

If the judging result of the step S105 indicates that the installation location of the lens unit of the image pickup module 13 does not comply with the production specifications, a warning signal is generated (Step S106). In the step S106, the test program 101 stores the test record in the computing device 10 and generates the warning signal. The warning signal is shown on the display module 11 to prompt the test worker. In case that an item of the image pickup module 13 does not comply with the production specifications (e.g., the linear distance h5 between the center O1 of the first lens unit 132 and the center O2 of the second lens unit 133), the warning signal is shown on the image IM of the display module 11 to indicate that the actual length corresponding to the linear distance h5 is lower or higher than the required value of the production specifications. According to the displayed information of the warning signal, the test worker can adjust or replace the physical lens unit of the image pickup module 13.

If the judging result of the step S105 indicates that the installation location of the image pickup module 13 complies with the production specifications, a test pass signal is generated (Step S107). In the step S107, the test program 101 stores the test record in the computing device 10 and generates the test pass signal. The test pass signal is shown on the display module 11 to prompt the test worker. According to the displayed information of the test pass signal, the test worker may remove the image pickup module 13 and places a next under-test image pickup module 13 in the detection box.

From the above descriptions, the present invention provides an image pickup module test system. After the under-test image pickup module is enabled, the image of the image pickup module and the block gauge reflected from the optical reflector is captured by the image pickup module. Then, the standard length value corresponding to the single pixel of the image is calculated according to the feature point of the block gauge. Then, according to the standard length value corresponding to the single pixel of the image and the actual lengths corresponding to the distances between some components of the image pickup module, the test program judges whether the installation location of the lens unit complies with the production specifications. Since the technology of the present invention is capable of quickly testing and judging whether the installation location of the lens unit complies with the production specifications, the efficiency of testing the size and specification of the image pickup module is enhanced and the production yield of the image pickup module is increased. In other words, the technology of the present invention is industrially valuable.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. An image pickup module test system for testing an installation location of at least one lens unit of an image pickup module, the image pickup module test system comprising:
   a computing device electrically connected with the image pickup module, wherein a test program is executed in the computing device;
   an optical reflector;
   a block gauge arranged in front of the optical reflector, wherein the block gauge has a standard length; and
   a fixing device, wherein the image pickup module is fixed at a position in front of the optical reflector by the fixing device,
   wherein when the test program is executed, the image pickup module is enabled to acquire an image of the image pickup module and the block gauge that is reflected from the optical reflector, wherein the test program analyzes the image to obtain a feature point of the image pickup module and a feature point of the block gauge, calculates a standard length value corresponding to a single pixel of the image according to the feature point of the block gauge, and judges whether the installation location of the at least one lens unit complies with a production specification according to the standard length value corresponding to the single pixel of the image and the feature point of the image pickup module.

2. The image pickup module test system according to claim 1, wherein the feature point of the image pickup module contains an edge feature of a lens module of the lens unit or an edge feature of a fastening hole of at least one fastening part.

3. The image pickup module test system according to claim 2, wherein the production specification contains a linear distance between a center of the lens module and a top edge of a casing of the image pickup module or a linear distance between the center of the lens module and a lateral edge of the casing.

4. The image pickup module test system according to claim 1, wherein the at least one lens unit comprises a first lens unit and a second lens unit, the first lens unit comprises a first lens module, the second lens unit comprises a second lens module, and the production specification contains a linear distance between the a center of the first lens module and a center of the second lens module.

5. The image pickup module test system according to claim 1, wherein the image pickup module test system further comprises a display module, wherein the display module comprises a display interface, and the image is shown on the display interface.

6. The image pickup module test system according to claim 1, wherein the image pickup module test system further comprises a light source, wherein the light source provides light beams that allow the image pickup module to acquire the image.

7. The image pickup module test system according to claim 1, wherein the optical reflector is a plane mirror.

8. The image pickup module test system according to claim 1, wherein the at least one lens unit and the block gauge are coplanar with each other, and a focusing distance between the at least one lens unit and the optical reflector is in a range between 3 cm and 6 cm.

9. The image pickup module test system according to claim 1, wherein the standard length of the block gauge is 2 cm.

10. An image pickup module test method for testing an installation location of at least one lens unit of an image pickup module, the image pickup module test method comprising steps of:
    (a) placing an image pickup module and a block gauge in front of an optical reflector, wherein the block gauge has a standard length;
    (b) enabling the image pickup module to acquire an image of the image pickup module and the block gauge reflected from the optical reflector;
    (c) analyzing the image to acquire a feature point of the image pickup module and a feature point of the block gauge in the image;
    (d) calculating a standard length value corresponding to a single pixel of the image according to the feature point of the block gauge;
    (e) judging whether the installation location of the at least one lens unit complies with a production specification according to the standard length value corresponding to the single pixel of the image and the feature point of the image pickup module, wherein if the installation location of the at least one lens unit does not comply with the production specification, a warning signal is generated, wherein if the installation location of the at least one lens unit complies with the production specification, a next step is performed; and
    (f) generating a test pass signal.

11. The image pickup module test method according to claim 10, wherein in the step (c), the feature point of the image pickup module in the image contains an edge feature of a lens module of the lens unit or an edge feature of a fastening hole of at least one fastening part.

12. The image pickup module test method according to claim 11, wherein in the step (d), the production specification contains a linear distance between a center of the lens module and a top edge of a casing of the image pickup module or a linear distance between the center of the lens module and a lateral edge of the casing.

13. The image pickup module test method according to claim 10, wherein in the step (d), the at least one lens unit comprises a first lens unit and a second lens unit, the first lens unit comprises a first lens module, the second lens unit comprises a second lens module, and the production specification contains a linear distance between the a center of the first lens module and a center of the second lens module.

* * * * *